(12) United States Patent
Jiang et al.

(10) Patent No.: US 7,423,777 B2
(45) Date of Patent: Sep. 9, 2008

(54) IMAGING SYSTEM AND BUSINESS METHODOLOGY

(75) Inventors: Hubin Jiang, 10359 Carol St., Great Falls, VA (US) 22066; Baiyun Gao, Vienna, VA (US)

(73) Assignee: Hubin Jiang, Great Falls, VA (US)

( * ) Notice: Subject to any disclaimer, the term of this patent is extended or adjusted under 35 U.S.C. 154(b) by 1150 days.

(21) Appl. No.: 10/627,305

(22) Filed: Jul. 25, 2003

(65) Prior Publication Data
US 2005/0018252 A1    Jan. 27, 2005

(51) Int. Cl.
*G06F 15/00* (2006.01)
*H04N 1/40* (2006.01)
*H04N 1/04* (2006.01)

(52) U.S. Cl. ............. 358/1.18; 358/474; 358/470

(58) Field of Classification Search .......... 358/1.18, 358/474, 470; 382/132, 131; 378/98.9, 205
See application file for complete search history.

(56) References Cited

U.S. PATENT DOCUMENTS

| | | | |
|---|---|---|---|
| 5,547,178 A * | 8/1996 | Costello | 270/52.02 |
| 5,704,602 A * | 1/1998 | Taylor et al. | 270/1.02 |
| 7,146,031 B1 * | 12/2006 | Hartman et al. | 382/132 |
| 2003/0197896 A1 * | 10/2003 | Doyle | 358/1.18 |

* cited by examiner

*Primary Examiner*—Houshang Safaipour
(74) *Attorney, Agent, or Firm*—Roberts Mlotkowski Safran & Cole, P.C.

(57) ABSTRACT

A digitization process and system which is initiated with the pick up and transport of documents to a scanning facility. Following pickup and transport, a number of additional steps are performed toward the goal of digitzing all documents without the loss of any documents and with assurance that all documents are properly catalogued, tracked and scanned. Various aspects of the process are designed to provide the highest possible assurance of document integrity. Further, the system and process herein disclosed assures proper merging of documents which may be scanned in parallel and via multiple scanning stations. In this way it is also possible to track, organize and scan documents associated with multiple projects in parallel and at one or more scanning stations.

15 Claims, 9 Drawing Sheets

CASE LEVEL SEPARATOR
Personal Injury Litigation Project

PIL0001-SvJ1414

Smith v. Jones

Case #: 1414

LEVEL 1 SEPARATOR - PLEADINGS
Personal Injury Litigation Project

LEVEL 2 SEPARATOR - DOCUMENT
Personal Injury Litigation Project

LEVEL 3 SEPARATOR - COMPLAINT
Personal Injury Litigation Project

LEAF SEPARATOR
Personal Injury Litigation Project

LEAF

BOX TRACKING SHEET

LOG PAGE

|  | OP ID | INIT | DATE |
|---|---|---|---|

DOCUMENT PREPARATION

BOX NUMBER: _____ _____ _____ _____

NUMBER OF BARCODES: _____ _____ _____ _____

LEADING BARCODE: _____ _____ _____ _____

ENDING BARCODE: _____ _____ _____ _____

---

AUDIT

PASS  FAIL  (1)_____ _____ _____ _____

PASS  FAIL  (2)_____ _____ _____ _____

---

SCAN

SCAN: _____ _____ _____ _____

---

IMAGE INTEGRITY CONTROL

PASS  FAIL  (1)_____ _____ _____ _____

PASS  FAIL  (2)_____ _____ _____ _____

---

IMAGE QUALITY CONTROL

PASS  FAIL  (1)_____ _____ _____ _____

PASS  FAIL  (2)_____ _____ _____ _____

---

REASSEMBLY

REASSEMBLY: _____ _____ _____ _____

| FOR TECHNICAL SUPERVISOR USE ONLY |
| IMAGING COMPLETED |
| Sign: _____ Date: _____ |

… # IMAGING SYSTEM AND BUSINESS METHODOLOGY

BACKGROUND

1. Field of the Invention

The present invention relates generally to document imaging and processing and more particularly to systems and methods for digitizing documents and storing and accessing the same.

2. Background of the Invention

Even with the widespread use of computers in business and in daily life, the use of paper-based documents to record, communicate and store information remains exceedingly popular. Although software applications offer new and improved functions such as character recognition, managed document archival and retrieval and specialized image processing, many businesses can not leverage these capabilities because they maintain a significant amount of information in paper form rather than electronically.

Various other drawbacks are associated with business processes that involve storing large amounts of information in paper form as opposed to maintaining such information electronically. For example, pages can easily be lost or misplaced, large physical spaces may be required for storing the documents, and information may not be readily accessed through search applications which are available for electronically stored information.

In some contexts, even though information was originally created and stored using paper documents, conversion to electronic format via digitization is required for one or more reasons. For example, in the case of litigation, it is often necessary to store, access, produce and analyze a large number of documents associated with the particular dispute. In most cases, the overall business process associated with converting physical documents in various formats into digital form is error prone, costly and time-consuming.

Various aspects of the overall task further complicate the process. For example, "paper-based" documents really represent many forms of physically stored information. This includes formats such as paper, microfilm and microfiche as well as other formats. Each of these formats generally requires its own, separate scanning device. Because of this, boxes of documents must be separated and fed into different scanning devices thus giving rise to the possibility that documents could be misplaced and/or the original document ordering could be lost.

Difficulties in maintaining document integrity and the original ordering also arise during other steps in the digitization business process. Boxes of documents and/or individual documents may be lost or caused to be out of order during pickup and/or transportation from the place where the documents are stored to the place where the documents are to be scanned. With typical digitization business processes, documents can also be lost or caused to be out of order during the time they reside at the scanning location and/or during the scanning process itself.

Yet another problem associated with typical document imaging business processes arises out of the fact that both human and machine error may manifest themselves during the process of scanning of physical documents. As a result, physical documents to be scanned can be lost, never scanned, scanned out or order and/or improperly scanned. Because of this problem it is generally not possible to validate the integrity of the scanned documents, their contents or their ordering. The inability to validate sets of imaged documents to a particular level of probability can, in turn, lead to situations in which the imaging process may not be applicable for a particular need.

For example, in the context of litigation, if document imaging was not originally done according to a process with a sufficient level of integrity verification, then difficulties may arise in connection with how a court treats the available evidentiary universe. Similarly, verification of document integrity can be a concern when documents are specifically imaged after the fact for the purposes of litigation. Imaging processes may also be unusable or suspect in other cases such as in the context of imaging, storing and cataloguing vital records such as birth certificates, passports as well as various other governmental and commercial vital records.

Document integrity in connection with an imaging process is of even more vital concern in the case where the source documents are destroyed following imaging. Often times, imaging is performed for the primary purpose of consolidating space and physical storage requirements. In this case, documents are typically destroyed or, at least, stored off-site in a relativly inaccessible form following digitization. In this case, electronic document integrity is even more critical since the source documents no longer exist or are difficult to retrieve.

SUMMARY OF THE INVENTION

It is therefore a primary object of the present invention to provide a business process and methodology which improves upon prior art methodologies and their related drawbacks as described above.

It is another object of the present invention to provide a business process and methodology which offers a higher level of assurance of document integrity resulting from the process.

It is yet another object of the present invention to provide a business process and methodology which includes inventory control such that the status of physical documents may be tracked during imaging.

It is a still further object of the present invention to provide a business process and methodology which ensures that all inventoried documents are imaged as a result of the process.

It is a further object of the present invention to provide a business process and methodology which ensures that documents from different scanning stations are merged during the scanning process.

It is a yet further object of the present invention to provide a manageable system for imaging, tracking, storing and retrieving documents which are organized with a large number of hierarchical levels.

It is a still further object of the present invention to provide a document imaging control system which operates according to the methodologies described above These and other objects of the present invention are obtained through the use of a novel business process which is initiated with the pickup and transport of documents to a scanning facility. Following pickup and transport, a number of additional steps are performed toward the goal of digitizing all documents without the loss of any documents and with assurance that all documents are properly catalogued, tracked and scanned. Various aspects of the process are designed to provide the highest possible assurance of document integrity.

The system and methodology of the present invention operate to track the status of physical documents during the course of digitization in order to assure document integrity. Further, the system and process herein disclosed assures proper merging of documents which may be scanned in parallel and viamultiple scanning stations. In this way it is also possible to track, organize and scan documents associated with multiple projects in parallel and at one or more scanning stations.

Additionally, according to the process of the present invention, hierarchical organization of documents can be handled regardless of the number of levels required. Such multiple level document images are translated into a one dimensional linear directory structure filing system for easier access and more efficient quality control capabilities.

Additional capabilities associated with the document imaging control system of the present invention include the ability to easily customize the system for use by various users according to their individual preferences and requirements. The system of the present invention may be deployed in a variety of environments including as an application service provider (ASP) solution, in a client server network or as a standalone software package.

These and other advantages and features of the present invention are described herein with specificity so as to make the present invention understandable to one of ordinary skill in the art.

DETAILED DESCRIPTION OF THE INVENTION

The present invention for document imaging and management is now described. The present invention comprises a system for document imaging and management as well as a process therefor. In the description that follows, numerous specific details are set forth for the purposes of explanation. It will, however, be understood by one of skill in the art that the invention is not limited thereto and that the invention can be practiced without such specific details and/or substitutes therefor. The present invention is limited only by the appended claims and may include various other embodiments which are not particularly described herein but which remain within the scope and spirit of the present invention.

Figure 1:
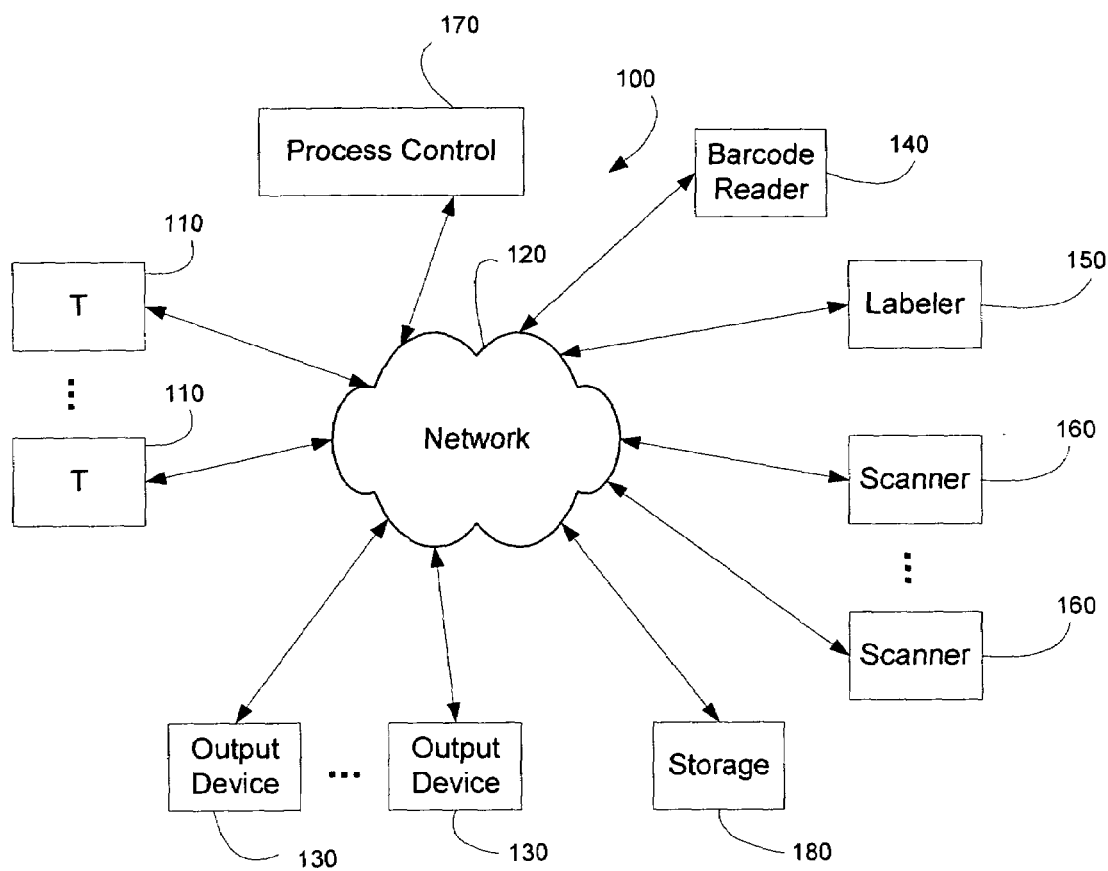
FIG. 1 is a block diagram illustrating the components of the system of the present invention in a preferred embodiment.

FIG. 1 is a block diagram of an architecture which may be used in connection with the implementation of the present invention. Although this figure and the following description reflect an embodiment in which the process control of the present invention is web-based or in which the process control is accessed via some other network connection, the present invention is not necessarily limited thereto. As discussed above, other embodiments are possible including a case in which the control process of the present invention is available on a standalone basis such as a standalone software program.

Turning now to FIG. 1, a description of the imaging system 100 of the present invention and the specific components included thereon is now provided. Network 120 provides communication between some or all of the other devices within system 100. Network 120 can take one of many forms including, for example, a local area network (LAN), a wide area network (WAN), the internet or other communication networks now known or hereinafter developed. Communication via network 120 may occur either through physical wiring or through a wireless communication protocol or both. One or more terminals (T) 110 are associated with the system and communicate with other components via network 120. These terminals preferably include input and output capabilities including a keyboard, a mouse, a display screen and a local processor. As such, terminals 110 may be personal computers or alternatively, they may be dumb terminals without processing capability. Each of terminals 110 may take a different form or they may be the same.

System 100 further preferably includes one or more scanners 160 which read images and text on physical media and convert them to electronic form. These scanners are preferably capable of scanning a variety of media such as paper documents, microfiche, microfilm and other formats now known or hereinafter developed. Multiple scanners 160 capable of reading the same format type may be included within system 100 to increase throughput. System 100 also preferably includes at least one barcode reader 140 which is capable of reading barcodes or other printed codes and transmitting them to process control 170.

Process control 170 is at the heart of system 100 and functions to control the overall digitization process including the novel aspects of such process as described in more detail below. In one embodiment, process control system may comprise one or more software programs running on a server or other computer. Process control 170 issues commands to various devices through network 120 and receives information concerning device and process status through network 120. Users may customize and/or otherwise interact with process control 170 via one or more of terminals 110.

System 100 may further include labeler 150 which generates labels including bar codes or other coding schemes. Such labels are used in connection with the overall novel process of the present invention as described in more detail below. Various output devices 130 may also be included. These devices may be used to write digital output resulting from scanning onto various media such as tape, CD-ROM, floppy disk and other storage media. Once created, this output media may be physically stored and/or delivered to one or more customers.

System 100 may also include one or more storage devices 180 which may also be employed to store digital output from scanning. Storage devices 180 may comprise various devices such as personal computers, servers, disk drives, RAID storage arrays as well as other devices capable of storing relatively large amounts of data. Given appropriate capability for cataloguing and systematically accessing data stored on storage devices 180, users may access such data without the need for any additional physical storage media through the use of one or more of terminals 110.

Figure 2:
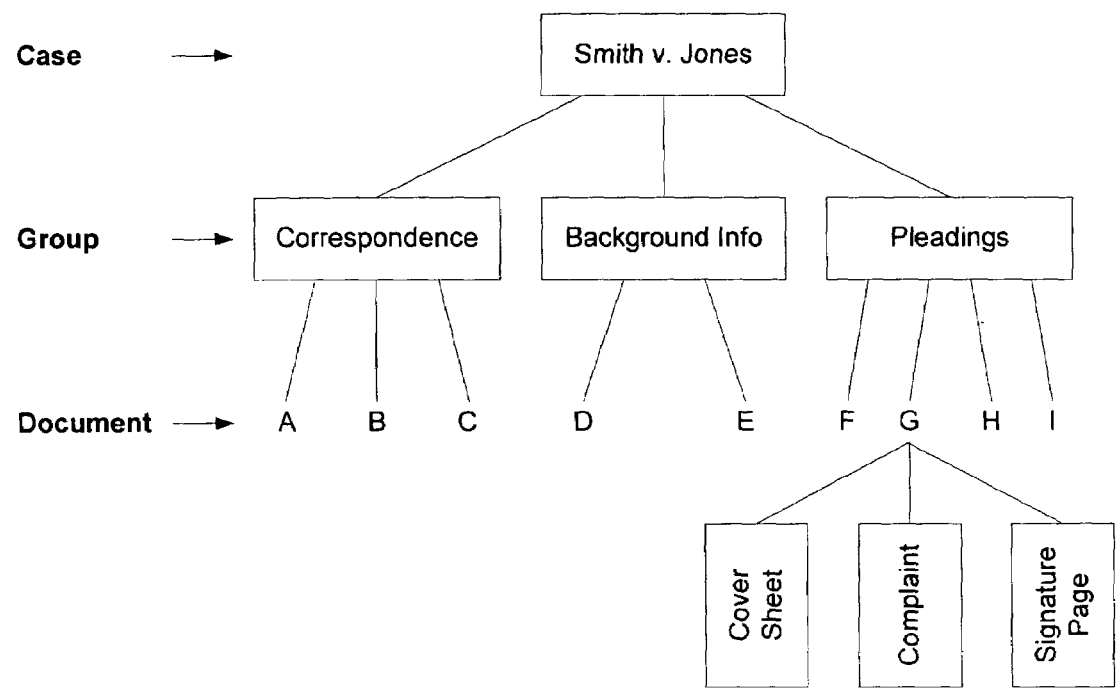
FIG. 2 is a diagram illustrating an exemplary set of hierarchical levels within a set of documents to be processed for imaging.

Now that a description of a possible architecture for the system of the present invention has been provided, and with reference to FIG. 2, a discussion of hierarchical levels associated with a typical document digitization process is provided. In addition, the following discussion provides information regarding the way in which the system and method of the present invention can handle multiple hierarchical levels in a manner such that quality control can be easily, rapidly and accurately effected.

The present invention can handle document imaging tasks that involve a large number of hierarchical levels. In many situations, a number of hierarchical levels are associated with an imaging task. The highest level is typically referred to as a project. Some projects involve the imaging of many cases. Cases may alternatively be referred to as files or records. In the example of a case, such as an ongoing matter being litigated, the case may include many categories of documents, and each category may be associated with many documents.

In the following example, three levels of documents are involved. It will be understood by one of skill in the art that various document sets may involve a larger or smaller number of levels and the system and method of the present invention may operate in all such cases. The following example is merely exemplary and for the purpose of generally illustrating a hierarchical structure which may be associated with a set of documents processed according to the teachings herein.

In this example, the first level is referred to as the case level, the second level is referred to as the category level, and the third level is referred to as the document level. The innovative system of the present invention can handle unlimited levels of hierarchies. As discussed below in more detail, the unique process of the present invention involves the use of separator sheets. Every separator sheet used has a barcode on it. The barcode, which serves as the identification of a new starting point, may delineate a new case, a new category, or a new document. To the extent additional or alternative levels exist, separator sheets are used to delineate the starting point for each new instance of an item falling under that level.

In a preferred embodiment of the present invention and according to the example being discussed, the formats of the barcodes are defined as follows:

Project ID

The Project ID is usually a unique ID identifying a project. The Project ID can be a number or a string.

Case ID

The Case ID is usually a unique ID identifying a case. It is usually an identification number or string, such as a case number, social security number, etc.

Case Level Barcode

The Case Level Barcode is defined as follows:
PREFIX-PROJECT ID-CASE ID
Where PREFIX and PROJECT ID are optional. The PREFIX is usually used to make the Case Level Barcode unique from all possible barcodes in documents, so the system can identify the Case Level Separator with no mistakes. The Case Level Barcode is unique for each case.

Level Separator Barcode

The Level Separator Barcode is used to separate a group of papers, which can be a category or document. It does not have to be unique. It can be the same for the same level of group of papers. It is defined as follows:
PREFIX—LEVEL INDICATOR—OPTION Where the LEVEL INDICATOR is a sequence number or other protocol which specifies the level of the current group of papers, for example, 1 specifies the level right under the case level, 2 specifies the level under level 1, and so on. The PREFIX and OPTION fields are optional. The PREFIX is usually used to make the Level Separator Barcode unique from all possible barcodes in documents, so the system can identify the Level Separator with no mistakes. OPTION may be used to make the Level Separator Barcode optically understandable and meaningful.

Leaf Barcode

The Leaf Barcode may be used to specify that a level has no further levels under it. In a preferred embodiment, it has following format:

LEAF

The barcode does not have to be "LEAF". It can be any unique symbol which is understood by the system as being indicative of the last level in the paper group hierarchy. The Leaf barcode is optional. When used, the preparation work may be easier because it is a barcode which can be repeatedly used. The Case Level Barcode, Level Separator Barcode, and Leaf Barcode are also collectively called Separator Barcodes.

By way of example and with specific reference to FIG. 2, assume that a project is to image all documents associated with a personal injury litigation. Specifically, a case between Smith and Jones is in the process of imaging preparation. In this example, using no PREFIX, the PROJECT ID is defined as PIL0001. The Case ID is S v J 1414, where 1414 is the unique docket number assigned by the court. Further assume that under this case there are various groupings of documents, the first being "correspondence", the second being "background information" and the third being "pleadings". Those three groups represent the first level under case level, and are referred to as categories. Finally assume that there are three letters under "correspondence"—A, B and C—that there are 2 brochures under "background information"—D and E—and that there are 4 pleadings under "pleadings"—F, G, H and I. Each of the lettered documents represents the document level, which is level 2. Finally, assume that for pleading G, there is a cover sheet, a complaint and a signature page. Each of these aspects of document G represents a lower hierarchical level below the document level.

The barcodes for this project, specifically for the Smith v Jones case, are as follows:

The Case Level Barcode, which used to identify Smith and Jones' personal injury litigation case, is
PIL0001-S v J 1414.

Figure 3:
FIG. 3 is an exemplary case level separator barcode which is used according to the process of the present invention in a preferred embodiment thereof.

An example Case Level Barcode for the Smith v. Jones case is provided in FIG. 3.

Figure 4:
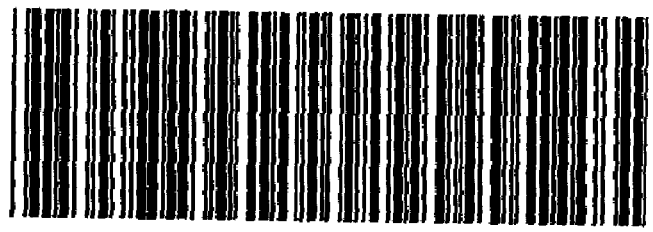
FIG. 4 is an exemplary level 1 separator barcode which is used according to the process of the present invention in a preferred embodiment thereof.

The Level Separator Barcodes for level one, the category level, are respectively:
1-CORRESPONDENCE
1-BACKGROUND
1-PLEADINGS without using PREFIX. An example of a Level Separator Barcode for level one, particularly the one for "Pleadings" is provided in FIG. 4.

Figure 5:
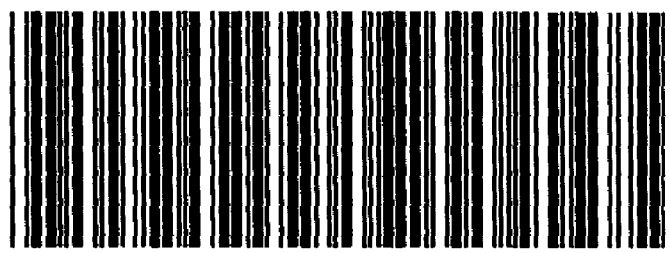
FIG. 5 is an exemplary level 2 separator barcode which is used according to the process of the present invention in a preferred embodiment thereof.

The Level Separator Barcode for level two, the document level, is
2-DOCUMENT without using PREFIX. An example of a level 2 Level Separator Barcode for "Document" is provided in FIG. 5.

Figure 6:
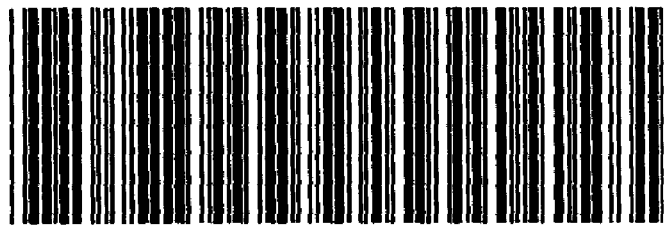
FIG. 6 is an exemplary level 3 separator barcode which is used according to the process of the present invention in a preferred embodiment thereof.

The Level Separator Barcodes for level three, the letter document level, are respectively:
3-COVER
3-COMPLAINT
3-SIGNATURE without using PREFIX. An example of a Level Separator Barcode for level 3 particularly the "Complaint" separator is provided in FIG. 6.

Figure 7:
FIG. 7 is an exemplary leaf separator barcode which is used according to the process of the present invention in a preferred embodiment thereof.

No Leaf Barcode is used in this project. A Leaf Barcode could, however, be used for documents A, B, C, D, E, F, H, and I, since they have no further group of papers underneath. An example of a Leaf Barcode is provided in FIG. 7.

In order to scan multiple-level prepared documents into a one dimensional directory structure in filing system according to the present invention, the use of a separator sheet with a barcode defined as above will realize the one-dimensional structure. Because of the one-dimensional-directory structure, the imaging system of the present invention has a simple filing structure so that system recovery, problem tracking, and system maintenance become easier and more efficient.

The process of the present invention proceeds according to the following algorithm in a preferred embodiment in order to realize the one-dimensional filing structure:

has a barcode as D0001, the regular image file name is 00000003.TIF, then the file name for this indicator page will be 00000003-D0001.TIF.

The system will look into a file or files scanned from a wide format scanner station under a filing directory named D0001 because the folder name of such drawing has a barcode D0001 attached. The system then appends all the files under filing directory, D0001, with a designator resulting in files named as D0001-0001.TIF, D0001-0002.TIF, . . . , respectively. These files are placed after the 00000003-D0001.TIF file. The 00000003-D0001.TIF will not be removed until the image Quality Control (QC) process is done because the 00000003-D0001.TIF serves as an indicator of QC point as discussed in more detail below.

Figure 8:
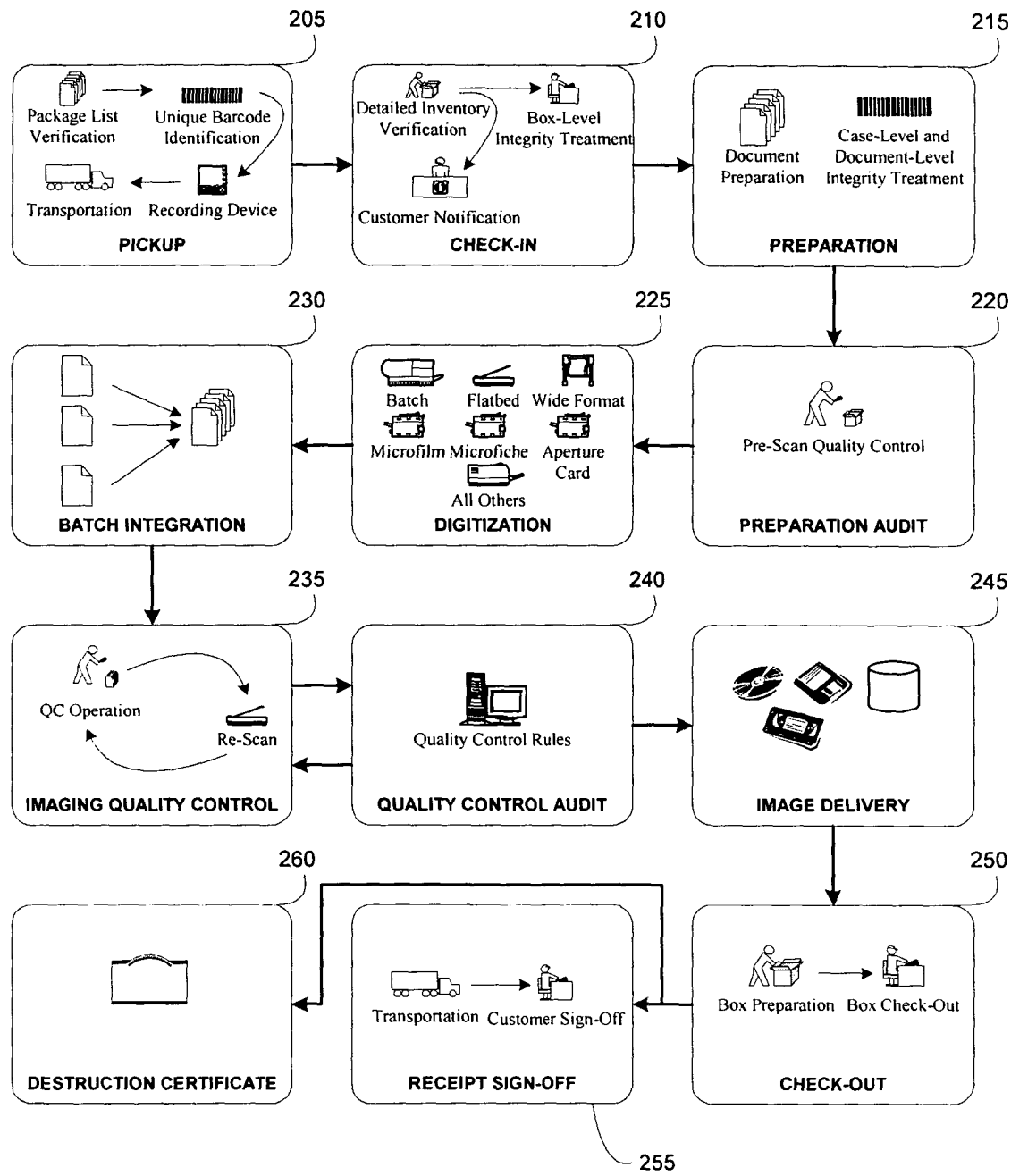
FIG. 8 is a process flowchart illustrating the overall digitization process of the present invention.

Referring now to FIG. 8, the process for digitizing data while obtaining the benefits described above is now described. In the first step (PICKUP) illustrated by block 205, a number of sub-steps are undertaken. Prior to documents

```
DEFINE Current_String AS A STRING
DEFINE Current_Level AS INTEGER
IF the system DETECTS a barcode
    THEN
        IF the barcode IS a separator barcode
            THEN
                IF the barcode IS a Case Level Barcode
                    THEN
                        Current_String = Case Level Barcode
                        SAVE Current_String AS Case Level String
                        Current_Level = Case Level
                    ELSE
                        IF NOT Leaf Barcode
                            THEN
                                Current_Level = LEVEL INDICATOR of Level Separator Barcode
                            ELSE
                                Current_Level = LEAF
                        END IF
                        Current_String = (Current_Level – 1) String
                        IF Current_Level – 1 = 0
                            THEN
                                Current_Level – 1 = Case Level
                        END IF
                        Current_String = Current_String + the barcode + Sequence #
                END IF
                CREATE a directory using the Current_String
        END IF
END IF
```

In order to reach 100% no-missing-scanning and scan-in-sequence quality control (QC) accuracy, the process of the present invention according to a preferred embodiment thereof places a unique sequence number on each page of document before scanning. This number confirms the pages, the sequence of the pages involved in a document and the box they belong to. The system may use Optical Character Recognition (OCR) to read the number on each image and point out the place in the image batch where any out-of-page-sequence, missing number, odd number, or other suspicious problems are found. The system can then interactively work with operator to make sure the problems are resolved.

In order to automatically merge all images scanned at different scan stations into one document, the innovative procedure places a corresponding indicator page for each special document page or pages (if the pages are in a group sequentially together) within a document. Whenever such an indicator page is detected, the image file name for the indicator page will be the regular image file name appending with the indicator page barcode plus a "-" in between. For example, when a drawing indicator page is detected, this drawing page actually being picked up, a document package list (DPL) is requested and received from the document owner. The DPL generally contains an entry for each container holding one or more documents as well as a description of the container and/or a container number. Individual documents not held by a container are also itemized on the DPL.

During the PICKUP step 205, the DPL is verified against the physical documents and containers. A unique barcode is issued and attached to each document container and each uncontainerized document and the barcode is entered into a recording device such as a palmtop, barcode reader, or other devices. As alluded to above, labeler 150 may be used to generate the barcode labels. These barcode labels are read and entered into system 100 via barcode reader 140 or some other device such that system 100, and in particular, process control 170 becomes aware of all document containers containing documents to be digitized as well as the corresponding coding for each such container or uncontainerized document.

Both barcode reader 140 and labeler 150 may be portable devices such that they may be easily brought to the facility initially housing the documents. In a preferred embodiment of the present invention, these devices may have a wireless communication link to network 120 and thereby system 100 for data collection and for importing such data into system 100. PICKUP step 205 also proceeds such that all documents and containers are sealed and transported if the digitization is to take place off of the document owner site. In this case, the documents and containers are next loaded onto a transport vehicle and transported to a digitizing facility or some other location wherein digitization is to take place.

The next step in the process of the present invention is CHECK-IN step 210. In this step, when the documents and containers arrive at the digitization facility, the DPL is first be imported into system 100. This may be accomplished manually via one of terminals 110 or through some automated process such as a coded DPL which may be read into system 100 without human intervention. Next, each time a container or noncontainerized document is brought from the transport vehicle into the digitization facility the barcode label previously placed thereon is scanned. This step verifies that each container and noncontainerized document which was picked up from the original document location has been successfully transferred to the digitization facility.

CHECK-IN step 210 may also include the sub-step of verifying and recording the cases contained in each container. Alternatively, this sub-step may be accomplished during the PICKUP step 205. However, in most situations it is not practical to do inventory the individual cases in each container at the original site due to pickup time, space and financial constraints. It is therefore preferable that individual cases be itemized at the digitization facility. It will be understood by one of skill in the art that when referring to "cases" as above, one is referring to an organizational aspect of document indexing. For example, a single container such as a box may contain a series of files which each of the files containing a number of papers. Although each of these files is contained in the same container/box, it does not necessarily mean that each of the files is associated with the same case. Continuing with the example, file #1 in container A may relate to a litigation between X and Y while file #2 in container A may relate to a litigation between P and Q. Based upon labeling of the files or review by an individual with the requisite knowledge to do so, files within a specific container may be assigned to one or more cases and such assignment is input into system 100.

After the detailed inventory verification associating documents within containers to specific cases as described above, a notification may be sent to the document owner which such notification serves to report the actual inventory received at case-level. This notification may be automatically generated by process control 170 upon completion of the detailed case level inventory.

Thus, CHECK-IN step 210 effects integrity verification at box- level by verifying the number of containers checked in. In addition, CHECK-IN step 210 records the specific cases associated with the container. For each box checked in, the following information, for example, may be recorded:

Project Name
Owner Information Including Name, Address, etc.
The Number of Cases
The Identification for Each Case
The Transportation Personnel Information
Check-In Site Information
Check-In Time/Date Stamps
Check-In Personnel Information
Assigned Box ID
Comments Other and/or alternative data may be required by and/or otherwise supplied to system 100 in connection with the detailed case inventory sub-step of CHECK-IN step 210. The next aspect of CHECK-IN step 210 calls for the generation and printing of tracking sheets with unique barcode information. The number of tracking sheets printed out depends up the number of preparation steps to be conducted (see below) plus an additional tracking sheet for overall box tracking purposes. This is because each step requires one operator to complete and each operator preferable signs off on a tracking sheet specifically designed and printed out for him/her. Therefore, at the end of the day, a supervisor can gather all the tracking sheets from different operators at different operation stages and generate a report and production statistics. Further, a tracking sheet is preferably used for overall status tracking of a box and operations on the box. Thus, for example, if preparation (see below) involves document preparation and labeling, the number of tracking sheet printed out will be three (3). The tracking sheets are placed into the box associated with each tracking sheet. Thus, in the above example, three tracking sheets would be placed in each box with each tracking sheet containing the specific barcode associated with the specific box.

The next step in the process is PREPARATION step 215. PREPARATION step 215 includes the sub-steps of major document preparation and integrity treatment at the case level and at the document level. The document preparation includes procedures to make each document pages scannable. For instance, the document preparation may involve staple removal, document repairing, putting small object documents on regular paper, etc. The case-level integrity treatment is accomplished by creating separator barcode sheets to group documents within a case and by using a special document folder methodology a discussed below. The case-level integrity treatment is performed to guarantee the integrity of a case when documents in the case are separated and scanned at different scan stations. Examples of such a separator sheets are provided in FIGS. 3-7.

An operator who prepares the document for imaging should be trained to be able to recognize what is a case, what is a document and what category a document belongs to, as well as having some additional knowledge concerning how papers should grouped in a case. When a case starts, the operator performing document preparation places the corresponding Case Level Separator as the leading page of the case documents. In the case of the example discussed above, when the operator recognizes the start point of the Correspondence group of paper, he/she places a Level 1 Separator—Correspondence as the leading page of the group. Inside the group, where a document is identified, the operator places a Level 2 Separator—Document as the leading page of the group of documents. There is no difference which group, Correspondence, Background, or Pleadings, is identified first the case. In other words, the operator is required only to place a corresponding separator barcode sheet as a leading page of the corresponding group of papers recognized. Information on a separator sheet can be anything that is visually noticeable and meaningful. The only mandatory element is the barcode. For example, in the barcode examples of FIG. 3-7 and discussed below, there is information about the level of the separator and the project name.

The document-level integrity treatment undertaken during the PREPARATION step 215 calls for placing a unique label with a sequence number on each page of each document (PAGE ID label). The sequencing may be based upon any reasonable methodology including, for example, Bates numbers or other schemes that follow a numerical sequence such that each page is associated with a unique document number. The case-level and document level treatments described above including the generation of separator sheets and unique document number labels, respectively, ensure that the pages and sequence of the pages can be captured in digital form without losing information associated with the documents in their original form and their original position, i.e. document and case integrity.

The document integrity aspect of PREPARATION step 215 can, in some cases, require the treatment of variety of type of documents, such as microfilm, microfiche, X-ray film, wide format drawing, etc. Each of these special document or page(s) (i.e. non-paper based documents) is placed into a special document folder and located according to its original sequence along with the documents before and after it. The special document folder is then labeled with a unique PAGE ID barcode. The PAGE ID barcode for non-paper documents may contain one or more special fields identifying the nature of the document material, such as F to specify microfiche
M to specify microfilm
X to specify X-ray film
D to specify wide format drawing In addition to placing a PAGE ID on a special document folder, it is preferable that a special barcode page with the same barcode as the PAGE ID be inserted into the paper document sequence (outside of the special document folder, either immediately before or immediately after the folder) wherever the special document page is exactly located. After finishing preparation of an entire box, an operator places an Operator ID Barcode label on one of the tracking sheets for that box and the operator checks a box on the tracking sheet to indicate that the preparation task has been done.

The next step in the digitization process of the present invention is the PREPARATION AUDIT step 220. This step involves the auditing of all information about each box. In connection with this step, an operator verifies whether or not the separator sheets are all matched with cases as well as the continuity of the barcode sequence of the separators. Additionally, the audit step sets up the sequence or positions of special documents in a case. Therefore, it guarantees the integrity of the case documents scanned at different scan stations. In connection with this step 220 the following exemplary information may be collected:

Name of Person Who Performed the Audit
Date/Time Stamp of the Audit
Comments

The DIGITIZATION step 225 is next. In this step, all documents are scanned box-by-box. In order to scan all pages in a box, the box may need go through different scanners either to increase throughput or because a box contains more than one document format. For example, if a document includes both paper pages and microfiche, the box containing this document must be scanned using a paper scanner for digitization of the papers, and then go to microfiche scanner for scanning of the microfiche. According to the teachings of the present invention, either format may be scanned first or they may be scanned in parallel. Thus, it is possible with the novel process of the present invention to physically separate the source documents for scanning with the knowledge that they will be properly ordered in digital form. Because all special format pages are registered during PREPARATION AUDIT step 220, it is not necessary to define which scanner must be used first.

The next step in the process is the BATCH INTEGRATION step 230. During this step, special images of special document pages are matched with their corresponding special barcode pages' images inserted during PREPARATION step 215, and each special barcode page image is appended with the corresponding image of the special document page.

The next step in the process is the IMAGING QUALITY CONTROL (QC) step 235. This step ensures that the image quality of the scans meet the requirements dictated by the customer. Also, during this step, the operator ensures the integrity of document images, that no scans were missed, and that no documents were mis-ordered. In case of any problems, rescanning is performed.

Following the IMAGING QC step 235, the QC AUDIT step 240 is performed. The QC AUDIT step 240 sets and enforces quality control rules including Optical Character Recognition (OCR) operation, which detects labels attached to each document page. The QC AUDIT step 240 interactively drives the QC process to verify the validation of the IMAGING QC. The OCR operation will look for a label on each image which was placed on the corresponding document page during the labeling process. It then reports to imaging QC operators any possibilities of missing label and out-of-sequence conditions and requires the operator to take actions of verification, validation, and correction.

The next step is the IMAGE DELIVERY step 245. In this step, output devices 130 under the control of process control 170 act to convert digitized images for storage on different physical media and into the formats required by the customer. Also, the images may be made ready to import into other systems for use by those systems or to deliver the images via CD-ROM, DVD, tapes, and other electronic media. During this step, all special barcode images added into case for imaging preparation may be removed.

The CHECK-OUT step 250 is next. During this step, an operator prepares the boxes for either return to their owner, off-site storage or destruction. Following this step is the RECEIPT SIGN-OFF step 255. This step is performed if the boxes need to be sent back to their owner or to some other location. This step includes box transportation and sign-off for receipt of the boxes. Finally, DESTRUCTION CERTIFICATE step 260 may be performed. During this step, if applicable, all papers in all the boxes are destroyed, and a certificate is issued for each box destroyed.

Figure 9:
FIG. 9 is an example of a tracking sheet created during the CHECK-IN step of the digitization process of the present invention.
Figure 9:

Any paper created by the system, such as tracking sheets, log sheets, and reports preferably have special unique LOG PAGE barcodes printed thereon. With the barcode, the system is able to detect any system generated paper scanned, which avoids any irrelevant document scanning by mistake. Illustrated in FIG. 9, two LOG PAGE barcodes are printed on a box Tracking Sheet. They are printed in portrait and landscape respectively to make sure the sheet is detected if scanned into system in both directions.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A methodology for imaging documents, said methodology comprising the steps of:
   (a) creating at least one separator barcode sheet;
   (b) placing said at least one separator barcode sheet at the beginning of each new grouping of documents, wherein at least one level of groupings is recognized by at least one correspondingly distinct separator sheet type;
   (c) scanning said documents; and (d) verifying the continuity of said barcode separator sheets, wherein there exists a document hierarchy of at least three levels and wherein a first level is a case level, a second level is a category level and a third level is a document level.

2. The methodology of claim 1 wherein said documents are located in a plurality of containers and wherein said methodology further comprises the step of recording information concerning said containers and the contents of said containers.

3. The methodology of claim 2 further comprising the step of generating tracking sheets containing information associated with said containers.

4. The methodology of claim 1 wherein some of said documents are scanned at a first scanning station and some of said documents are scanned at a different scanning station.

5. The methodology of claim 1 wherein said case level is associated with a level 1 barcode separator, said category level is associated with a level 2 barcode separator and said document level is associated with a level 3 barcode separator.

6. The methodology of claim 1 wherein each of said barcode separators comprises a sheet of paper containing a barcode.

7. The methodology of claim 6 wherein at least one barcode separators further comprises textual or graphical information.

8. The methodology of claim 1 further comprising the step of creating special document folders for including documents of a specialized format.

9. The methodology of claim 8 wherein each said special document folder is labeled with a unique barcode.

10. The methodology of claim 9 wherein said unique barcode comprises information representative of the format of a document.

11. A system for imaging documents comprising:
(a) at least one labeler;
(b) at least one scanner; and
(c) a process control function for controlling the imaging of documents wherein said labeler creates at least one separator barcode sheet and wherein said at least one separator barcode sheet is placed at the beginning of each new grouping of documents, wherein said documents are organized according to a hierarchy of at least three levels and wherein a first level is a case level, a second level is a category level and a third level is a document level.

12. The system of claim 11 wherein said documents are located in a plurality of containers and wherein said methodology further comprises the step of recording information concerning said containers and the contents of said containers.

13. The system of claim 11 further comprising means for storing and retrieving images which are scanned by said at least one scanner.

14. The system of claim 12 wherein said system generates tracking sheets containing information associated with said containers.

15. The system of claim 11 wherein said case level is associated with a level 1 barcode separator, said category level is associated with a level 2 barcode separator and said document level is associated with a level 3 barcode separator.

* * * * *